Sept. 8, 1936.  E. STEINHARDT  2,053,380

TRANSMISSION

Filed Aug. 15, 1934  2 Sheets-Sheet 1

INVENTOR
Ernest Steinhardt
BY
Wheeler, Wheeler & Wheeler
ATTORNEYS

Sept. 8, 1936.          E. STEINHARDT          2,053,380
TRANSMISSION
Filed Aug. 15, 1934          2 Sheets-Sheet 2
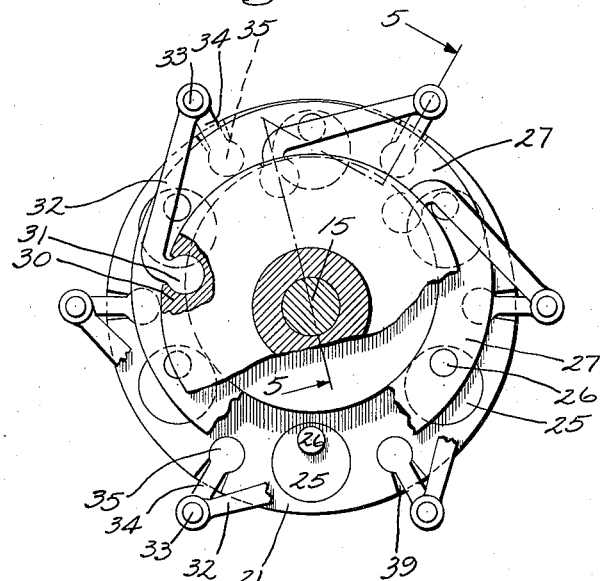
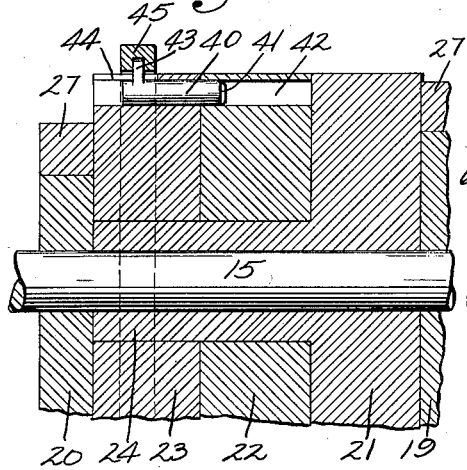
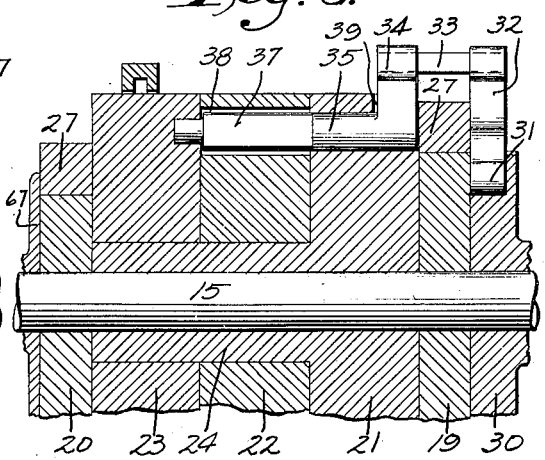
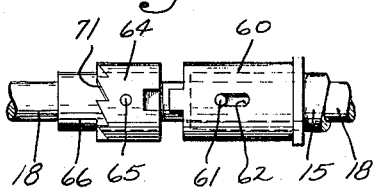
INVENTOR
Ernest Steinhardt
BY
ATTORNEYS Patented Sept. 8, 1936

2,053,380

UNITED STATES PATENT OFFICE 2,053,380

TRANSMISSION

Ernest Steinhardt, Beaver Dam, Wis., assignor of one-half to John Novicke, Beaver Dam, Wis.

Application August 15, 1934, Serial No. 739,860

15 Claims. (Cl. 74—63)

This invention relates to improvements in transmissions.

It is the primary object of the invention to provide a novel and improved transmission mechanism having an infinite ratio of change of rate of transmission of motion between the driving and driven members, the control being effected by a binding or cramping action which is automatically self-proportioning to the power to be transmitted so that the device will function smoothly and uniformly throughout the range of speeds and loads for which it is adapted. It is my purpose to provide a device by which, regardless of the load on the driven shaft, the rate of operation of the driven shaft will automatically be selected by the device as the highest rate of operation at which the power available can operate the driven shaft under the given load. If the available power be increased or the load decreased, the rate of operation of the driven shaft will automatically increase, the rate of the driving shaft remaining constant. The operation is also automatic for the converse situation.

A further object of the invention is to provide a novel and improved reversing gear set peculiarly adapted for use in conjunction with a transmission of the character here disclosed, and so designed that its gears are all at rest in the direct drive relation of the parts, the operative coupling and uncoupling of the gears being effected by a single bodily movement of the entire set.

Other objects and advantages will appear from the following disclosure.

In the drawings:

Fig. 3 is a view taken in section in the plane indicated by line 3—3 of Fig. 1, portions of the structure being broken away.

Fig. 4 is a detail view taken in section on the line indicated at 4—4 in Fig. 2.

Fig. 5 is a detail view taken in section on the line 5—5 of Fig. 3, and showing the parts which bind the crank shafts for the transmission of motion.

Fig. 6 is a detail view in plan showing portions of the clutch devices of the reversing part of the transmission.

Like parts are designated by the same reference characters throughout the several views.

Figure 1:
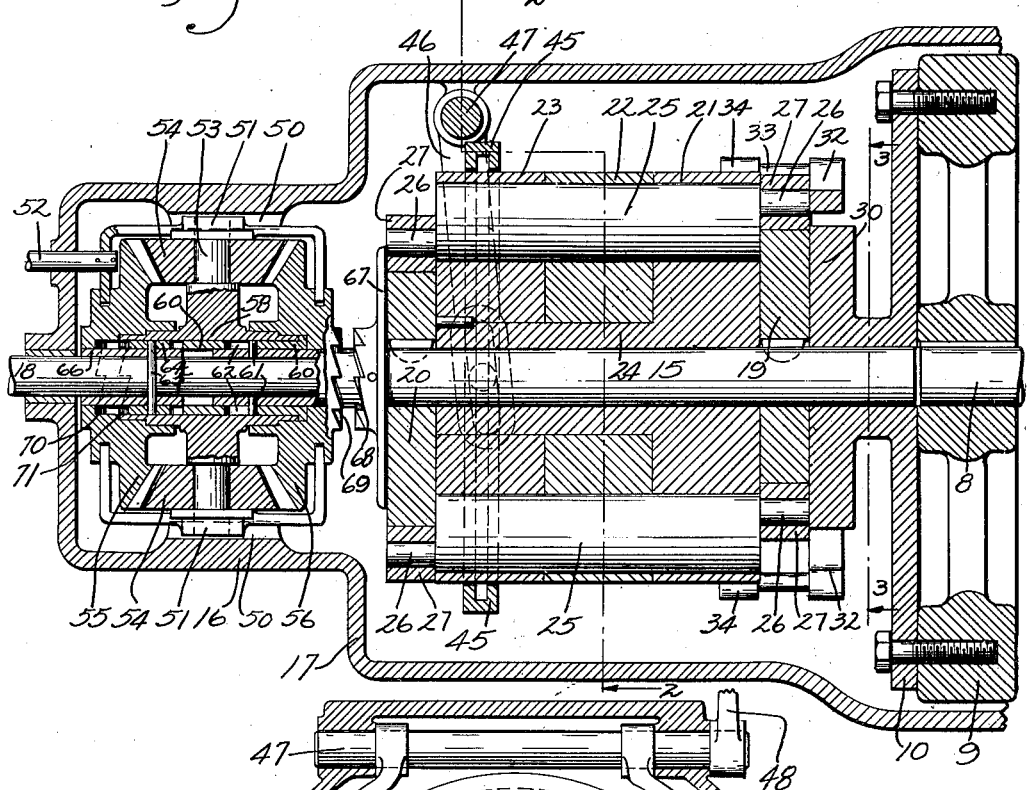
Fig. 1 is an axial section through the entire device showing a unitary assembly of the infinite ratio of transmission and reverse gear set.

For the purposes of the disclosure, motion is derived from an engine crank shaft 8 and flywheel 9, to which is bolted the driving member 10 of the transmission.

The intermediate shaft which is driven by the infinite ratio speed changer is designated by reference character 15. From this shaft motion is transmitted either by direct drive or through the reversing mechanism housed in the reduced portion 16 of casing 17 to the power output or ultimately driven shaft 18 of the transmission.

The mechanism whereby an infinite range of change speed ratios is automatically produced is as follows.

The intermediate driven shaft 15 carries a pair of eccentrics 19 and 20 which are keyed to it. Between these eccentrics are confined a plurality, preferably three, rings 21, 22, and 23. The hub portion 24 of ring 21 extends through ring 22 and is keyed to ring 23 so that rings 21 and 23 are connected for unitary movement. Suitable bores in the several rings accommodate crank shafts 25 having at their respective ends crank pins 26 bearing in eccentric straps 27 engaged peripherally upon the eccentrics 19 and 20. The throw of the crank pins 26 is exactly equal to the throw of the eccentrics so that if the rings 21, 22, and 23 be rotated to give the crank shafts 25 a planetary movement about the driven shaft, such movement will be accommodated by the movement of the eccentric straps about the eccentrics and a corresponding rotation of the crank shafts 25 upon their respective axes. It will be obvious, however, that to the degree to which the freedom of rotation of the crank shafts is opposed, motion will be transmitted to require the rotation of the driven shaft in the same direction in which the rings 21, 22, and 23 are rotated.

Means now to be described is provided for transmitting the driving motion to the rings while at the same time rotatively offsetting ring 22 with reference to rings 21 and 23, whereby to oppose the rotation of the several crank shafts to a degree which will depend upon the load or resistance to movement of the driven shaft.

The driving member 10 of the transmission carries a flange 30 having axially extending and generally cylindrical channels opening to its periphery in which the heads 31 of links 32 are pivoted as clearly shown in Figs. 3 and 5. These links extend tangentially with reference to the flange 30 to a sufficient distance to clear the eccentric strap 27 in all positions thereof. Outside of the path of movement of the eccentric strap the links are engaged with pins 33 carried by the rocker arms 34 on rock shafts 35.

Figure 2:
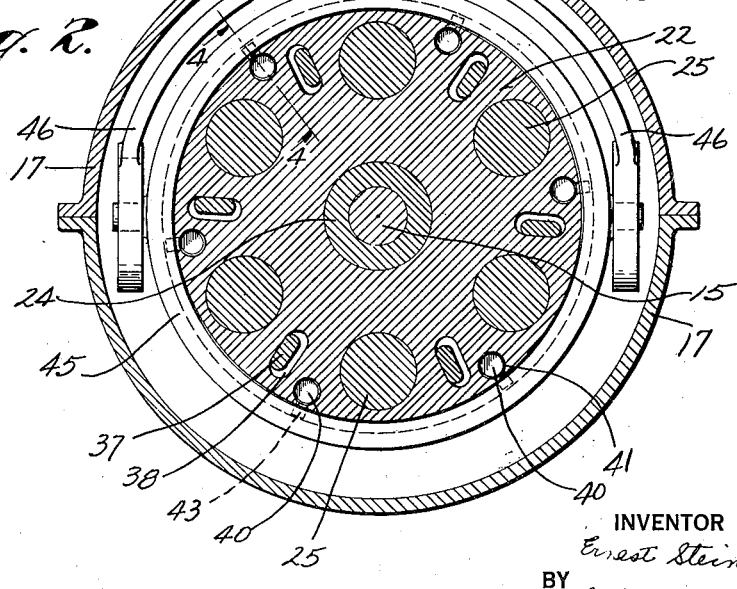
Fig. 2 is a view taken on the line 2—2 of Fig. 1 showing a portion of the mechanism in transverse section.

Rock shafts 35 are journalled in discs 21 and 23, as clearly shown in Fig. 5. Intermediate the cylindrically formed portions of the rock shafts 35 which are so journalled, the rock shafts have a flattened portion 37. The flattened portions 37 of the several rock shafts pass through elliptical openings 38 in the disc 22, as best shown in Figs. 2 and 5. It will be noted that the flat sides of the flattened portions 37 of the rock shafts 35 are each engaged with corresponding side wall portions of the disc 22 in their respective openings 38 therein. Any tendency of the rock shaft to turn upon its axis will cause the flattened portions 37 thereof to exert pressure on the disc 22, tending to rotate said disc with respect to the rock shaft and the discs 21 and 23 in which the rock shafts are carried.

All motion from the flange 30 of the driving member 10 is transmitted through the links 32 and the arms 34 of the several rock shafts to the series of discs 21, 22, and 23 to rotate these discs with the driving member 10. As above explained, the rotation of these discs tends to rotate the eccentric straps 27 about the axis of the driven shaft 15, thereby either occasioning the rotation of the shaft 15 or, if such rotation be resisted, occasioning the rotation of the crank shafts 25 by the slippage of the eccentric straps 27 upon the eccentrics 19 and 20.

Now, since the motion is all transmitted through the rocker arms 34, movement of which is accommodated by the recesses 39 in ring 21, there is a tendency for the driving force not only to rotate the rings, but also, if such rotation be resisted, to oscillate the rock shafts 35, thereby shifting ring 22 slightly with reference to rings 21 and 23 to cramp simultaneously the several crank shafts 25. The cramping resistance to movement of the crank shafts will always be proportioned to the resistance to the motion of the driven shaft 15. If, for example, the driven shaft turns freely without substantial resistance, there will be no occasion for the movement of the eccentric straps about the eccentrics,—the crank shafts 25 will not rotate and the driving pressure transmitted through the links 32 to the rock shafts 35 will rotate the rings 21, 22, and 23 without exerting more cramping pressure through ring 22 than is required to assure that shaft 25 will be held stationary. This is the direct driving relation of the parts.

If, however, there is substantial resistance to the rotation of the driven shaft 15, which is sufficient to cause the slippage of the eccentric straps 27 upon the eccentrics 19 and 20, such slippage can be accommodated only by the rotation of the crank shafts 25 in opposition to the cramping pressure exerted thereon, and this cramping pressure is automatically increased as the relative resistance to the operation of the driven shaft is increased. Tests of the device show that with a small motor applying power to the driving member 10 of the device, the load on the driven member may be increased to any degree within the capacity of the parts, and notwithstanding such load, the driven shaft 15 will still be operated at a speed which is sufficiently reduced to permit the motor to carry the increased load.

When it is desired to assure disengagement of motion transmission, this may be accomplished by eliminating the cramping action of ring 22 with reference to rings 21 and 23 upon the crank shafts 25. For this purpose, I preferably employ a series of dowel pins 40 mounted in suitable bores in the ring 23, as best shown in Fig. 4, and provided with tapered ends 41 movable in the corresponding bores 42 of ring 22, as best appears in Fig. 4. These pins are controlled by arms 43 projecting through slots 44 in ring 23 and engaged in a channel of a slip ring 45 which is moved axially of the transmission by the arms of a shifting fork 46 carried by a rock shaft 47 and actuated by crank 48 in a conventional manner. (See Figs. 1 and 2.)

The bores 42 of ring 22 are so located that when the dowel pins 40 are forced therein as shown in Fig. 4, the several bores in which crank shafts 25 are journalled are accurately aligned to eliminate completely all cramping of said crank shafts. Thus the rings 21, 22, and 23 are locked together to receive rotation, but there is no relative cramping movement through the rock shafts 35, and since the crank shafts will now turn freely, the eccentric straps 27 will likewise rotate freely upon eccentrics 20, which will remain stationary.

I shall now describe the preferred form of reversing mechanism designed particularly for use in conjunction with this transmission. Suitable guides 50 within the reduced portion 16 of the transmission housing 17 provide for the bodily sliding movement of a yoke 51 which is actuated to and fro by a control rod 52, and not only support the spider 53 for pinions 54, but also retain the gears 55 and 56 in mesh with such pinions for unitary sliding movement within the housing.

Confined between the hub portion 58 of the yoke 53 and the hub portion of gear 56, is the flange, shown in Fig. 1, of the sleeve-like clutch member 60. The pins 61 connected with the tubular end of shaft 15 and engaged in slots 62 of the clutch sleeve 60 require the rotation of the clutch sleeve with shaft 15 while permitting the axial movement of the clutch sleeve upon such shaft in accordance with movement of yoke 51, spider 53, and the reversing gear set.

In Fig. 1 the clutch sleeve 60 is illustrated as being engaged with a double ended clutch sleeve 64 which is made fast on shaft 18 by means of a pin 65 which extends through said shaft and the intermediate bushing 66. Clutch member 64 is separately illustrated in Fig. 6. It will be obvious that when the clutch members 60 and 64 are engaged as shown in Fig. 1, a direct motion transmitting connection is effected between the tubular end of shaft 15 and the portion of the driven shaft 18 which is telescopically socketed therein.

When the reversing gear set is moved bodily to the right as viewed in Fig. 1, the member 60 is moved out of engagement with the driven clutch element 64, as shown in Fig. 6. Thereupon two other clutches are engaged to connect the gears of the reversing mechanism to the driving and driven shafts respectively. A plate 67 on the intermediate shaft 15 carries clutch teeth 68 engageable by complementary teeth 69 of the driving gear 56 of the reversing set. The driven gear 55 of the reversing set is internally provided at 70 with teeth complementary to and adapted to mesh with the teeth 71 of the driven clutch member 64 on the driven shaft 18. Thus the movement of the reversing assembly to the right as viewed in Fig. 1 not only disengages the direct drive clutch 60 from the driven clutch member 64, but simultaneously effects an engagement of clutch teeth 69 with clutch teeth 68 and with clutch teeth 71, whereby motion transmitting connections are effected between shaft 15 and shaft 18 through the reversing gears 56, 54, and 55.

I claim:

1. In a transmission, the combination with driving and driven members, of a movable part, means coupled between said driving and driven members and connected with said part for the movement of said part in response to relative movement between said members, brake mechanism operatively connected to said part and including means for its adjustment whereby the opposition to movement of said part is variable, and a driving connection to the driving member through said adjusting means whereby the opposition of the movement of said part will vary in accordance with the load on the driven member to vary automatically the rate of movement of the driven member.

2. In a transmission, the combination with a pair of relatively rotative members, of a part operatively connected between said members to be rotated by relative movement therebetween, mechanism opposing the rotation of said part and provided with means for adjusting it as to degree of opposition to such rotation, said means being mounted on one of said members, and means providing a driving connection to said last mentioned member through said means and including mechanism for adjusting said means in a direction to increase the opposition to rotation of said part as the relative resistance to the movement of the other member is increased.

3. In a transmission, the combination with a pair of relatively movable members, of a part connected between said members to rotate upon the occurrence of relative movement therebetween, means opposing the rotation of said part, and means including a crank mounted on one of said members for adjusting said opposing means as to the degree of its opposition to the rotation of said part, and a driving connection to the last mentioned member through said crank whereby to oscillate said adjusting means in accordance with the torque required for the rotation of the other of said members.

4. In a transmission, the combination with concentric relatively rotatable members, of a rotatable part mounted upon one of said members and connected between said members to rotate upon the occurrence of relative rotation therebetween, means adjustably opposing the rotation of said part, adjusting mechanism for said opposing means mounted on the same member that carries said part and having an element movable with respect to said member, and driving connections to said last mentioned member through said element, whereby to operate said adjusting means in the driving of said last mentioned member, such operation being in a direction to increase the opposition to rotation of said part in accordance with an increase in the torque required to drive the other said members through said part.

5. In a transmission, the combination with a driven member, of a relatively movable member concentrically mounted thereon, a shaft rotatably mounted in the relatively movable member, motion transmitting connections from the relatively movable member to the driven member and including connections to said shaft for the rotation thereof upon the occurrence of relative movement between said members, braking means opposing the rotation of said shaft, a crank connected with said braking means, controlling the degree of opposition to shaft rotation, said crank being mounted on said relatively movable member, and driving means including a link connected with said crank for the transmission of motion to said last mentioned member through said braking means for the actuation of the driven member.

6. In a transmission, the combination with a driven shaft, of a plurality of discs mounted thereon, a crank shaft extending through corresponding bores in the respective discs, a crank upon the the crank shaft, an eccentric upon the driven shaft, an eccentric strap mounted on the eccentric and connected with the crank, the throw of the eccentric and the crank being alike whereby to occasion rotation of the crank shaft upon occurrence of relative movement between the driven shaft and the discs, means for angularly offsetting the discs to cramp the rotation of the crank shaft, and a driving connection to the discs through said offsetting means whereby to develop the torque required for the operation of the driven shaft.

7. In a transmission, the combination with a driven shaft carrying a pair of eccentrics in staggered relation, of a set of discs mounted between said eccentrics, a set of crank shafts journalled in the several discs and extending through an intermediate disc of said set, crank pins at the opposite ends of the crank shafts having a throw substantially equal to that of eccentrics, eccentric straps mounted on the eccentrics and provided with bearings for the several crank pins whereby to occasion crank shaft rotation upon the occurrence of relative rotation between the driven shaft and the set of discs, means including a rock shaft and crank arm for effecting relative angular movement between said intermediate disc and the other discs of said set, and a driving connection to said disc set through the crank arm of said rock shaft, whereby to develop a cramping resistance to crank shaft rotation for the development of torque for the rotation of the driven shaft.

8. In a transmission, the combination with a driven shaft carrying a pair of eccentrics in staggered relation, of a set of discs mounted between said eccentrics, a set of crank shafts journalled in the several discs and extending through an intermediate disc of said set, crank pins at the opposite ends of the crank shafts having a throw substantially equal to that of the eccentrics, eccentric straps mounted on the eccentrics and provided with bearings for the several crank pins whereby to occasion crank shaft rotation upon the occurrence of relative rotation between the driven shaft and the set of discs, means including a rock shaft and crank arm for effecting relative angular movement between said intermediate disc and the other discs of said set, and a driving connection to said disc set through the crank arm of said rock shaft, whereby to develop a cramping resistance to crank shaft rotation for the development of torque for the rotation of the driven shaft, together with dowel means movable for engagement and disengagement between said intermediate disc and another disc of said set whereby said intermediate disc may be locked out of cramping engagement with said crank shafts for the interruption of motion transmission to said driven member.

9. In a transmission, the combination with a driven shaft and a pair of eccentrics mounted in spaced relation thereon, of a set of discs mounted on said shaft between said eccentrics, means connecting the outermost discs while leaving an intermediate disc free for relative angular displacement, a set of crank shafts journalled in the outermost discs and in the intermediate disc and provided with crank pins at their respective ends, eccentric straps mounted on their respective eccentrics and connected with said pins whereby to cause rotation of said crank shafts upon the occurrence of relative rotation between said discs and the driven shaft, rock shafts journalled in the outermost discs and provided with surfaces engaged with the intermediate disc to occasion the angular displacement thereof upon the rotation of the rock shafts, crank arms carried by the rock shafts, and driving means provided with links connected to the respective crank arms whereby to drive said discs through said rock shafts while occasioning relative angular movement of the intermediate disc respecting the outermost discs, whereby to cramp said crank shafts and occasion the development of torque for the rotation of said driven shaft.

10. In a transmission, the combination with relatively movable members, of a part connected between said members to receive movement upon the occurrence of relative movement between said members, mechanism opposing the movement of said part, means for adjusting the degree of opposition of said mechanism to part movement, a driving connection through said last mentioned means to one of said members whereby to effect said adjustment while driving said member, and an alternative driving connection independent of said means whereby to permit the movement of said part without opposition.

11. In a transmission, the combination with relatively movable members, of a part connected between said members to receive movement upon the occurrence of relative movement between said members, mechanism opposing the movement of said part, means for adjusting the degree of opposition of said mechanism to part movement, a driving connection through said last mentioned means to one of said members whereby to effect said adjustment while driving said member, and means for locking said adjusting means in a position ineffective to oppose the movement of said part, whereby to interrupt the transmission of motion between said members.

12. In a transmission, the combination with driving and driven members, of a movable part, means providing motion transmitting connections operatively connected for differential operation in accordance with relative movement between the driving and driven members and connected to said part for the actuation thereof in accordance with such movement, a variably operable brake mechanism acting on said part and having adjusting means varying the braking effect thereon, a motion transmitting train including in series said driving and driven members, and a torque responsive device, and a connection from said torque responsive device to said brake adjusting means to vary the resistance to movement of said part in accordance with the torque developed in said train.

13. In a transmission, a motion transmitting train including in series a torque responsive device, a driving member, a driven member, and means including a movable part operatively coupled between said driving and driven means and differentially responsive to relative movement therebetween, together with a brake adjustably effective upon said part, and a connection between said torque responsive device, and brake including means for varying the resistance to movement of said part in accordance with the torque required in the operation of the driving member.

14. In a transmission requiring a relative adjustment of operating pressures between two members, the combination with such members and a driving element and a driven element, of a yieldable connection therebetween, and means operated by the yielding of said connection for increasing the pressure between said members.

15. In a transmission, the combination with a rate changing mechanism having two members, and means for adjusting the pressure of one upon the other, of a pair of relatively movable driving elements for said rate changing mechanism, a torque responsive device connecting said elements and including a movable arm, said arm being operatively connected with the means whereby relative pressures are varied as between said members.

ERNEST STEINHARDT.